Patented Apr. 28, 1942

2,281,485

UNITED STATES PATENT OFFICE 2,281,485

SEPARATION OF SODIUM PHENOLATE FROM SODIUM SULPHITE

Albert Thomas Fellows, Irvington, N. J., assignor, by mesne assignments, to Allied Chemical & Dye Corporation, a corporation of New York No Drawing. Application July 20, 1940, Serial No. 346,527

11 Claims. (Cl. 260—628)

This invention relates to an improvement in that step of the sulphonation process for the manufacture of phenol from benzene which involves separation of sodium phenolate from sodium sulphite produced by fusion of sodium benzene sulphonate with caustic soda.

A common method of preparing synthetic phenol involves sulphonating benzene to form benzene sulphonic acid, neutralizing the benzene sulphonic acid to form sodium benzene sulphonate, fusing the sodium benzene sulphonate with caustic soda to produce sodium phenolate and sodium sulphite, separating the sodium phenolate from the sodium sulphite, and recovering phenol from the phenolate. Separation of the sodium phenolate and sodium sulphite produced by fusion of the sodium benzene sulphonate with caustic soda is usually effected by treating the fusion mass with water, whereby most of the sodium phenolate dissolves, leaving the greater part of the sodium sulphite undissolved. However, this method of separation has proved to be somewhat unsatisfactory because sodium sulphite is by no means insoluble in water, and sodium phenolate tends to remain undissolved in the sodium sulphite mass; obviously, in view of these factors further treatment of both the undissolved residue and the solution is required in order to recover substantially pure sodium phenolate and sodium sulphite. In addition, there is a substantial cost involved in evaporating the water from the sodium phenolate solution to recover the phenolate therefrom.

It is an object of this invention to provide a process whereby sodium phenolate and sodium sulphite contained in a fusion mass produced by fusing sodium benzene sulphonate and sodium hydroxide may be completely and efficiently separated.

I have now discovered that a substantially complete and highly effective separation of the sodium phenolate and sodium sulphite present in fusion masses resulting from the fusion of sodium benzene sulphonate and caustic soda may be effected by treating the fusion mass with a solvent selected from the group consisting of saturated monohydric aliphatic alcohols, preferably a monohydric alcohol containing not more than 5 carbon atoms. The sodium phenolate, I have discovered, dissolves almost completely in such solvents, whereas sodium sulphite and the small amounts of sodium sulphate present in the fusion mass remain almost completely undissolved. The solvent used in accordance with this invention need not be an anhydrous alcohol but an alcohol containing as high as about 15% water may be used. By carrying out the separation in accordance with this invention, I have found the yields of both the sodium sulphite and sodium phenolate obtained are substantially improved over those obtained by carrying out the separation with water; the quality of the sodium sulphite obtained is also improved. Furthermore, the cost of the manufacture of phenol is substantially reduced, since evaporation of the solvents used in accordance with this invention from the sodium phenolate solution to recover the phenolate therefrom may be effected at substantially lower consumption of heat energy than is the case when water is employed to separate the sodium phenolate and sodium sulphite.

My invention may be carried out by contacting the fusion mass in any suitable manner with a solvent selected from the group above defined. Methanol, ethanol, propanol, isopropanol, secondary butanol and n-amyl alcohol may be mentioned as examples of the solvents which have been found suitable for use in the practice of my invention. The fusion mass may be treated by running the molten mass directly into the solvent in an apparatus provided with means to recover the vaporized solvent. Preferably, however, the fusion mass is cooled and crushed and the crushed mass then passed countercurrent to a flow of the solvent in a suitable extraction vessel. The amount of solvent employed may vary, depending upon the particular solvent used. I have found that when using anhydrous methanol as the solvent, from about 1½ to about 5 parts of methanol per part of fusion mass may be employed satisfactorily. The use of about 2 pounds of methanol per pound of fusion mass has given excellent results; larger quantities of methanol, e. g. 5 pounds per pound of fusion mass, avoid difficulties which might arise from the handling of highly concentrated methanol solutions. As pointed out above the solvent used need not be anhydrous; the amount of water that may be present in the solvent may vary depending upon the particular solvent used. Thus, when usuing an aqueous solution of methanol as the solvent, I have found that a methanol solution containing as high as 15% water may be used without appreciably affecting the efficiency of the separation and without appreciably contamination of the solution with sodium sulphite. However, substantially larger amounts of water than an amount corresponding to about 15% of the solvent are to be avoided, since the sodium sulphite tends to dissolve more readily in solutions having a high water content. The time of contact will vary depending on the particular solvent used and the temperature at which the contact is carried out; ordinarily between about 10 and about 30 minutes are sufficient. The temperature at which contact of the fusion mass with the solvent is effected may vary from about 20° C. up to the boiling point of the particular solvent used. While the use of temperatures substantially above room temperature requires the expenditure of additional heat, I have found that at such temperatures it is possible to work with more concentrated solutions of sodium phenolate, thereby decreasing the solvent throughput; furthermore, the rate of solution of the phenolate is increased, thereby permitting a decrease in the size of the necessary equipment.

After the fusion mass has been contacted with the solvent for a suitable time, the sodium phenolate solution is separated from the sodium sulphite residue in any suitable manner, e. g. by filtration or centrifuging. The sodium sulphite may then be treated again with the solvent to remove any sodium phenolate still remaining in the sulphite. In operation of the process of this invention it has been found advantageous to use the dilute phenolate solution resulting from the second extraction or rewash of the sulphite residue as the solvent for the first extraction of the fusion mass, and to use fresh solvent for the treatment of the sulphite residue. The sodium phenolate may be recovered from the solution thereof by distilling off the solvent or in any other suitable manner; the solvent may then be reused. Evaporation of the solvent from the phenolate solution may be assisted by indirectly contacting the solution with the hot fusion mass before it is permitted to harden. The sodium phenolate thus obtained may then be treated to obtain phenol.

The following example is illustrative of my invention. Amounts are given in parts by weight.

A fusion mass produced by fusing sodium benzene sulphonate with caustic soda was dropped onto a steam-cooled chipping machine and the resulting chips were disintegrated into pieces measuring approximately ¼" x 1/16". About 426 parts of the chipped mass were agitated slowly with about 852 parts of methanol in a jacketed, trough-like tank equipped with a suitable agitating device and maintained at a temperature of about 40° C. After about 15 minutes agitation the mass was transferred to a solid-bowl, continuous centrifuge, wherein the sodium sulphite residue was separated from the solution. The sodium sulphite was then given a further wash with methanol in a second agitator to remove the remainder of the sodium phenolate, and the methanol liquor and sodium sulphite were again separated in a solid-bowl centrifuge. The solid material resulting from these operations contained about 204 parts of sodium sulphite, about 14 parts of sodium sulphite, and about 9 parts of methanol; this solid material was passed to a drier and the methanol recovered therefrom. The alcoholic phenolate liquor which contained approximately 207 parts of phenolate and about 843 parts of methanol was distilled to recover the sodium phenolate therefrom, water being added to keep the phenolate in solution during distillation, the methanol distillate being reused.

Instead of using methanol in the above example, a methanol solution containing about 15% water may be employed in substantially the same manner.

It will be seen from the above description that my invention provides a simple and effective method for accomplishing separation of sodium phenolate and sodium sulphite. Furthermore, it permits the production of increased yields of phenol by a considerably less expensive process.

Since certain changes may be made in carrying out the above process without departing from the scope of the invention, it is intended that all matter contained in the above description shall be interpreted as illustrative and not in a limiting sense.

I claim:

1. In the sulphonation process of synthesizing phenol from benzene involving the step of fusing sodium benzene sulphonte with caustic soda, the improvement which comprises separating sodium phenolate from sodium sulphite produced by said fusion by treating the fusion mass with a saturated monohydric aliphatic alcohol solvent.

2. In the sulphonation process of synthesizing phenol from benzene involving the step of fusing sodium benzene sulphonate with caustic soda, the improvement which comprises separating sodium phenolate from sodium sulphite produced by said fusion by contacting the crushed fusion mass countercurrently with a solvent selected from the group consisting of saturated aliphatic monohydric alcohols containing not over 5 carbon atoms and aqueous solutions thereof containing less than about 15% water, and recovering sodium phenolate from the solution thus formed.

3. In the sulphonation process of synthesizing phenol from benzene involving the step of fusing sodium benzene sulphonate with caustic soda, the improvement which comprises separating sodium phonolate from sodium sulphite produced by said fusion by treating the fusion mass with methanol.

4. In the sulphonation process of synthesizing phenol from benzene involving the step of fusing sodium benzene sulphonate with caustic soda, the improvement which comprises separating sodium phenolate from sodium sulphite produced by said fusion by contacting the crushed fusion mass countercurrently with methanol.

5. In the sulphonation process of synthesizing phenol from benzene involving the step of fusing sodium benzene sulphonate with caustic soda, the improvement which comprises separating sodium phenolate from sodium sulphite produced by said fusion by treating the fusion mass with an aqueous solution of methanol containing less than about 15% water.

6. In the sulphonation process of synthesizing phenol from benzene involving the step of fusing sodium benzene sulphonate with caustic soda, the improvement which comprises separating sodium phenolate from sodium sulphite produced by said fusion by contacting the crushed fusion mass countercurrently with methanol in the amounts of between about 1½ and about 5 parts of methanol per part of fusion mass, separating the methanol solution thus formed from the sodium sulphite residue, and recovering sodium phenolate from the mehanol solution.

7. In the sulphonation process of synthesizing phenol from benzene involving the step of fusing sodium benzene sulphonate with caustic soda, the improvement which comprises separating sodium phenolate from sodium sulphite produced by said fusion by treating the fusion mass with ethanol.

8. In the sulphonation process of synthesizing phenol from benzene involving the step of fusing sodium benzene sulphonate with caustic soda, the improvement which comprises separating sodium phenolate from sodium sulphite produced by said fusion by contacting the crushed fusion mass countercurrently with ethanol.

9. In the sulphonation process of synthesizing phenol from benzene involving the step of fusing sodium benzene sulphonate with caustic soda, the improvement which comprising separating sodium phenolate from sodium sulphite produced by said fusion by treating the fusion mass with isopropanol.

10. In the sulphonation process of synthesizing phenol from benzene involving the step of fusing sodium benzene sulphonate with caustic soda, the improvement which comprises separating sodium phenolate from sodium sulphite produced by said fusion by contacting the crushed fusion mass countercurrently with isopropanol.

11. In the sulphonation process of synthesizing phenol from benzene involving the step of fusing sodium benzene sulphonate with caustic soda, the improvement which comprises separating sodium phenolate from sodium sulphite produced by said fusion by contacting the crushed fusion mass with about 2 parts of methanol per part of fusion mass at a temperature above room temperature but below the boiling point of methanol, separating the methanol solution thus formed from sodium sulphite residue, washing said residue with methanol, combining the methanol solutions, and recovering sodium phenolate therefrom.

ALBERT THOMAS FELLOWS.

CERTIFICATE OF CORRECTION.

Patent No. 2,281,485. April 28, 1942.

ALBERT THOMAS FELLOWS.

It is hereby certified that error appears in the printed specification of the above numbered patent requiring correction as follows: Page 1, second column, line 48, for "usuing" read --using--; page 2, first column, line 66, for "sulphite" read --sulphate--; and second column, line 19, claim 1, for "sulphonte" read --sulphonate--; and line 69, claim 6, for "mehanol" read --methanol--; page 3, first column, line 11, claim 9, for the word "comprising" read --comprises--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.